(12) United States Patent
Cheng et al.

(10) Patent No.: US 8,763,501 B2
(45) Date of Patent: Jul. 1, 2014

(54) HAND TOOL AND PORTABLE ELECTRONIC DEVICE

(75) Inventors: Wen-Chieh Cheng, New Taipei (TW); Li-Sheng Lin, Taipei Hsien (TW); Hsin-Hao Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 203 days.

(21) Appl. No.: 13/451,885

(22) Filed: Apr. 20, 2012

(65) Prior Publication Data

US 2013/0036878 A1 Feb. 14, 2013

(30) Foreign Application Priority Data

Aug. 11, 2011 (TW) .............................. 100128702 A

(51) Int. Cl.
| | |
|---|---|
| *B25B 11/00* | (2006.01) |
| *B25B 13/48* | (2006.01) |
| *B25B 23/00* | (2006.01) |
| *G06F 1/16* | (2006.01) |

(52) U.S. Cl.
CPC ............... *B25B 11/007* (2013.01); *B25B 23/00* (2013.01); *G06F 1/166* (2013.01); *B25B 13/48* (2013.01)
USPC .......................... 81/489; 248/688; 361/679.59

(58) Field of Classification Search
USPC ............ 81/489, 491; 248/682, 683, 688, 689; 361/679.55, 679.59
See application file for complete search history.

(56) References Cited

U.S. PATENT DOCUMENTS

| | | | |
|---|---|---|---|
| 6,400,562 B1 | 6/2002 | Lee et al. | |
| 6,880,796 B2 * | 4/2005 | Khor et al. | 248/677 |
| 8,172,191 B1 * | 5/2012 | Zimbalatti | 248/346.01 |
| 8,243,432 B2 * | 8/2012 | Duan et al. | 361/679.3 |
| 8,403,288 B2 * | 3/2013 | Cheng | 248/688 |
| 2003/0217623 A1 | 11/2003 | Brown | |
| 2006/0237623 A1 * | 10/2006 | Sung | 248/688 |
| 2009/0101789 A1 * | 4/2009 | Chen | 248/687 |
| 2010/0053888 A1 | 3/2010 | Nagamura et al. | |

FOREIGN PATENT DOCUMENTS

| | | |
|---|---|---|
| CN | 2491872 Y | 5/2002 |
| CN | 201365384 Y | 12/2009 |

OTHER PUBLICATIONS

Chinese Office Action issued for Chinese counterpart application No. 201110248623.7, dated Apr. 1, 2014 (English translation of sections boxed in red of the Chinese Office Action).

* cited by examiner

*Primary Examiner* — David B Thomas
(74) *Attorney, Agent, or Firm* — Dickstein Shapiro LLP

(57) ABSTRACT

A portable electronic device includes a device body and a hand tool. The hand tool includes a handle unit, a coupling unit, and a tool body. The coupling unit includes a coupling element attachable removably to the device body. The tool body is connected between the handle unit and the coupling unit, and includes a working head projecting from the coupling element. When not in use, the hand tool is attached to the device body, and can be easily carried together with the device body. When removed from the device body, the hand tool can be used.

18 Claims, 10 Drawing Sheets

# HAND TOOL AND PORTABLE ELECTRONIC DEVICE

CROSS-REFERENCE TO RELATED APPLICATION

This application claims priority of Taiwanese Application No. 100128702, filed on Aug. 11, 2011, the disclosure of which is incorporated herein by reference.

BACKGROUND OF THE INVENTION

1. Field of the Invention

The invention relates to a hand tool and a portable electronic device, and more particularly to a hand tool attachable removably to a portable electronic device.

2. Description of the Related Art

For a conventional portable electronic device such as a notebook computer, typically, a computer casing is assembled by use of bolts, so that the computer casing can be disassembled to allow for replacement of electronic components built therein. However, a proper hand tool, such as a screw driver, is required for the assembly and disassembly of the computer casing. It is troublesome for a user to carry the notebook computer and the hand tool simultaneously.

SUMMARY OF THE INVENTION

Therefore, the present invention is to provide a hand tool that is attachable to a device body of a portable electronic device, so that it can be easily carried together with the device body.

In addition, the present invention is to provide a portable electronic device that includes a hand tool attachable to a device body thereof.

According to an aspect of this invention, a hand tool is attachable to a device body of a portable electronic device. The hand tool includes a handle unit, a coupling unit, and a tool body. The coupling unit includes a main body and a coupling element. The coupling element is disposed on the main body, and is attached removably to a casing of the portable electronic device. The tool body is connected between the handle unit and the coupling unit, and includes a working head projecting from the coupling element.

According to another aspect of this invention, a portable electronic device includes a device body and a hand tool. The device body includes a casing and a plurality of electronic components disposed within the casing. The hand tool includes a handle unit, a coupling unit, and a tool body. The coupling unit includes a main body and a coupling element. The coupling element is disposed on the main body, and is attached removably to a casing of the portable electronic device. The tool body is connected between the handle unit and the coupling unit, and includes a working head projecting from the coupling element.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE PREFERRED EMBODIMENT

Figure 1:
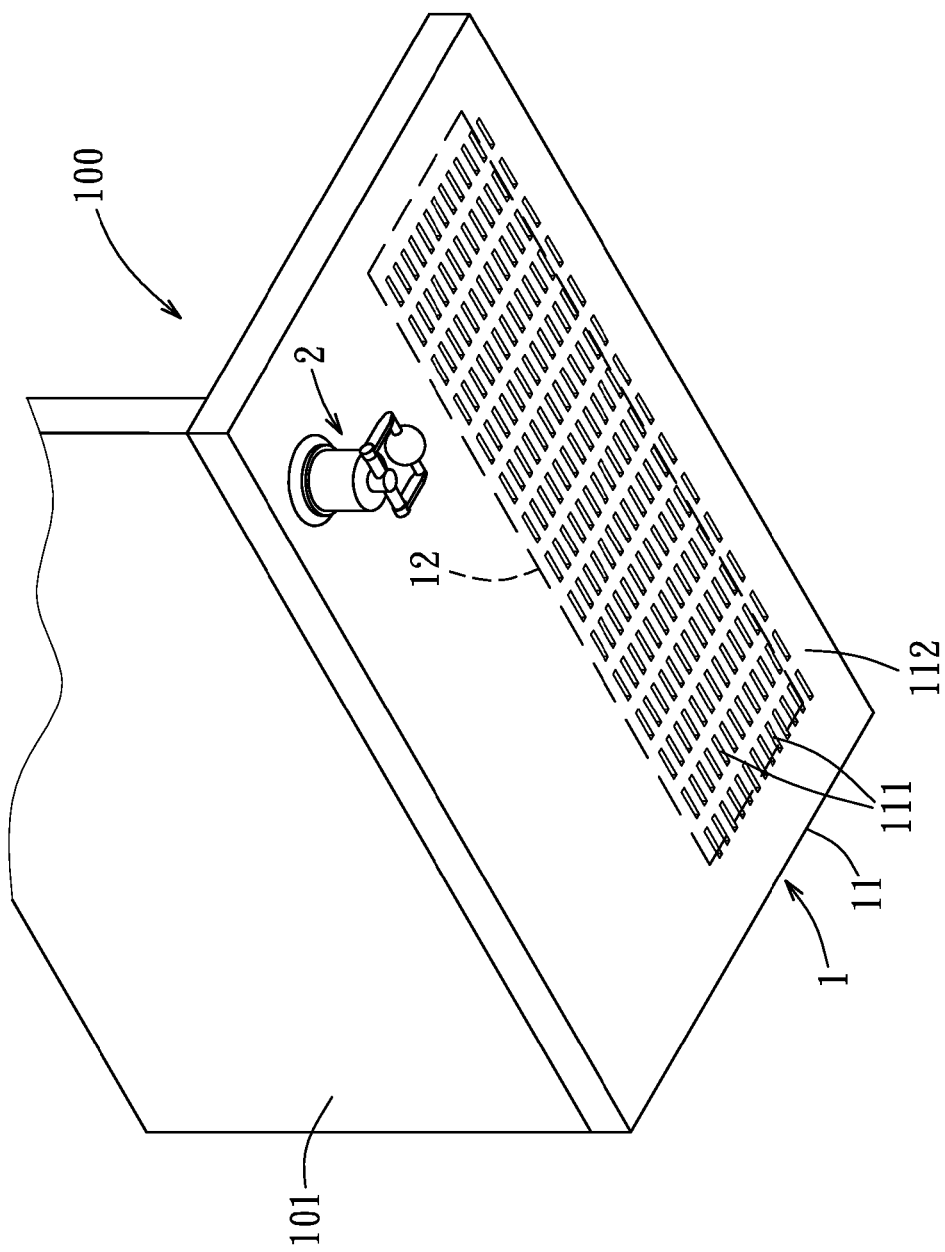
FIG. 1 is a perspective view of the embodiment of a portable electronic device according to the present invention.
Figure 2:
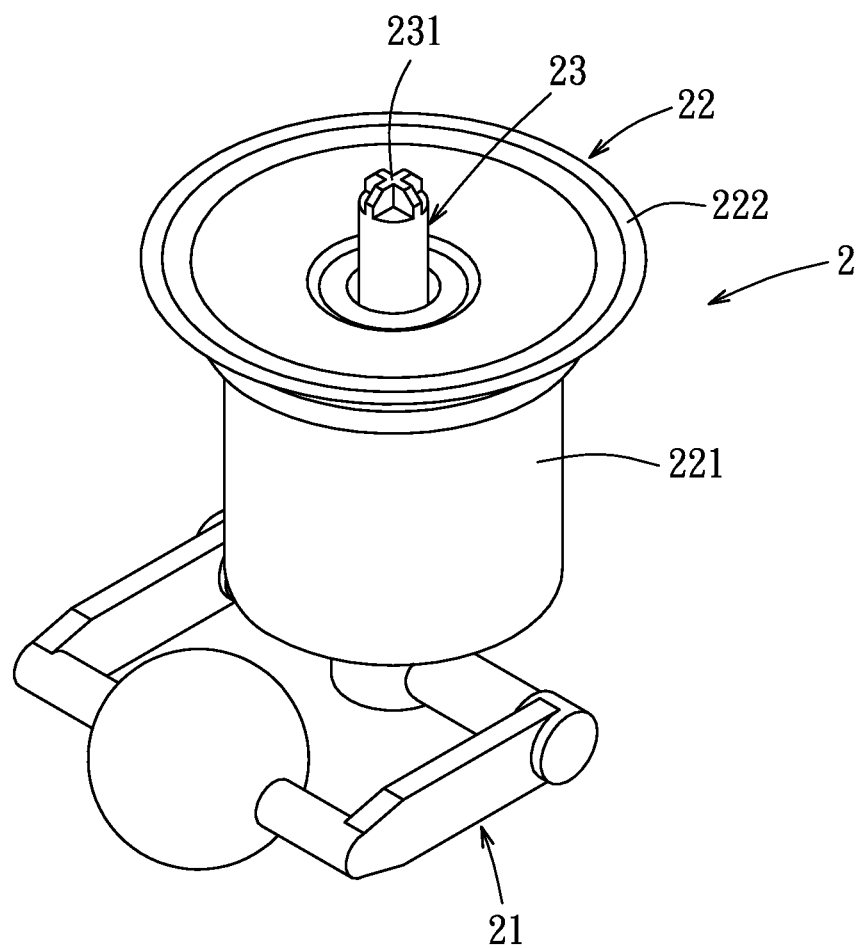
FIG. 2 is a perspective view of a hand tool of the embodiment.

Referring to FIGS. 1 and 2, in an embodiment of the present invention, a portable electronic device 100 is exemplified using a notebook computer. The portable electronic device 100 includes a device body 1, a screen 101 disposed on the device body 1, and a hand tool 2. The device body 1 is a host of a notebook computer, and includes a casing 11 and a plurality of electronic components 12 disposed within the casing 11. The electronic components 12 include a mother board, a central processing unit (CPU), and a hard disk for achieving basic operation of the host. Alternatively, the portable electronic device 100 may be a tablet computer, for which the hand tool 2 is required during assembly and disassembly thereof.

The hand tool 2 is attached removably to the casing 11 of the device body 1, so that it can be easily carried together with the device body 1, and is removable from the casing 11 for convenient use at any time. The hand tool 2 includes a handle unit 21, a coupling unit 22, and a tool body 23 connected between the handle unit 21 and the coupling unit 22. The coupling unit 22 includes a main body 221 and a coupling element 222 disposed on the main body 221. The coupling element 222 is attached removably to the casing 11. The tool body 23 includes a working head 231 configured as a Phillips head screw driver bit. In this embodiment, the working head 231 of the tool body 23 is movable relative to the main body 221 between an extended position, where the working head 231 projects from the coupling element 222, and a retracted position, where the working head 231 is retracted into the main body 221. As such, when it is desired to use the hand tool 2 for disassembling or assembling the hand tool 2, the working head 231 is operable to project from the coupling element 222, so that the hand tool 2 can be used. Contrarily, when the hand tool 2 is not used, the working head 231 is operable to retract into the main body 221 so as to allow the coupling element 222 to be attached to the device body 1.

In this embodiment, the coupling element 222 is a sucking disc. The hand tool 2 is sucked to the casing 11 of the device body 1 by the sucking disc 222. Alternatively, the coupling element 222 may be attached removably to the main body 221 by a tongue-and-groove engagement or in a similar manner.

Therefore, through cooperation between the coupling unit 22 and the tool body 23, the hand tool 2 is attached removably to the device body 1, so that the hand tool 2 can be used conveniently at any time.

Figure 3:
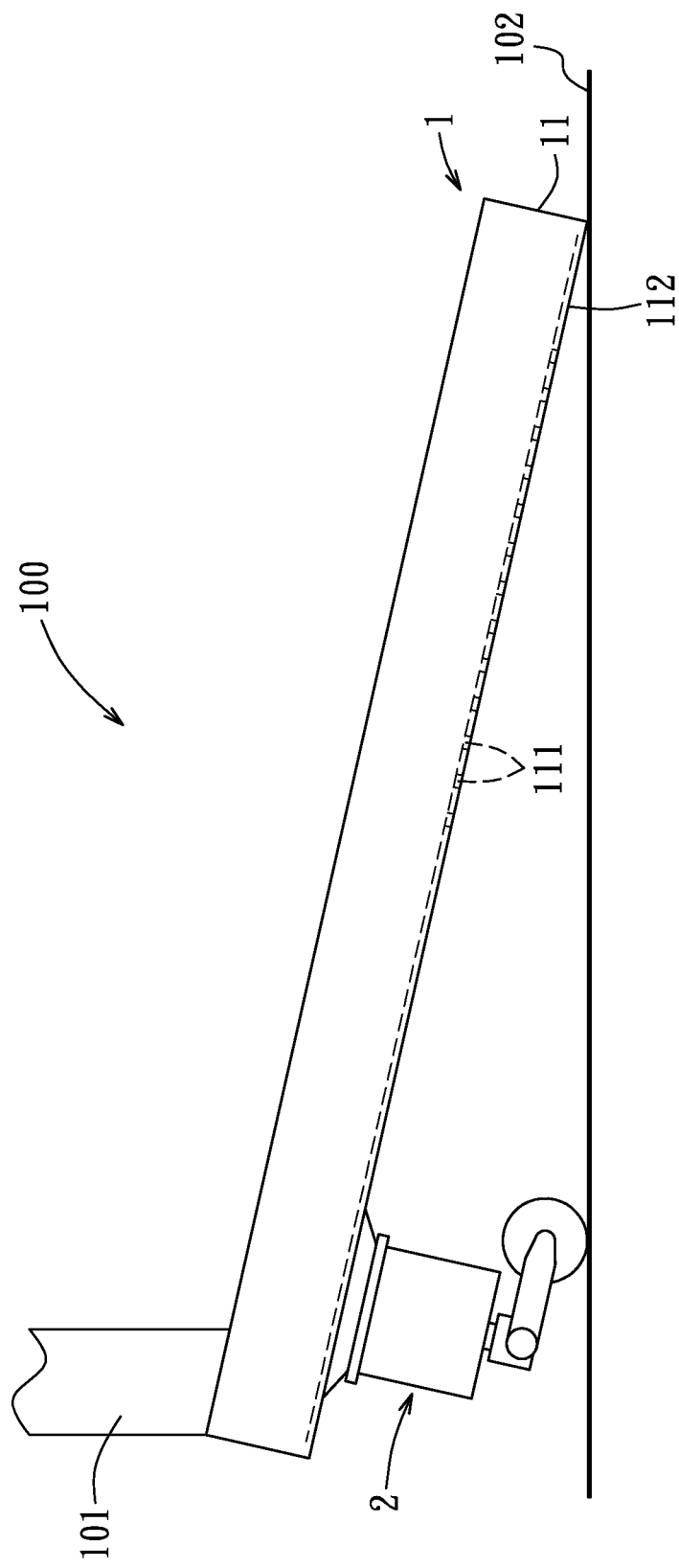
FIG. 3 is a side view of the hand tool of the embodiment, illustrating that the hand tool supports a device body on a supporting surface.

Referring to FIGS. 1 and 3, the casing 11 of the device body 1 includes a bottom wall 112 formed with a plurality of holes 111. In this embodiment, the holes 111 act as heat-dissipating holes for the device body 1. The coupling element 222 of the hand tool 2 is attached to a bottom surface of the bottom wall 112 of the casing 11. The portable electronic device 100 can be placed on a horizontal supporting surface 102, in such a manner that the hand tool 2 is attached to the left end of the casing 11, and the handle 2 and the right end of the casing 11 are in contact with the supporting surface 102. Due to the height of the hand tool 2, a space is left between the bottom wall 112 of the casing 11 and the supporting surface 102, so as to allow for sufficient heat convection between ambient air and hot air flowing from the holes 111, thereby facilitating dissipation of heat from the device body 1. To maintain the balance of the device body 1 when the portable electronic device 100 is placed on the supporting surface 102, a plurality of hand tools 2 may be attached to the bottom wall 112 of the device body 1 at the same time.

Figure 4:
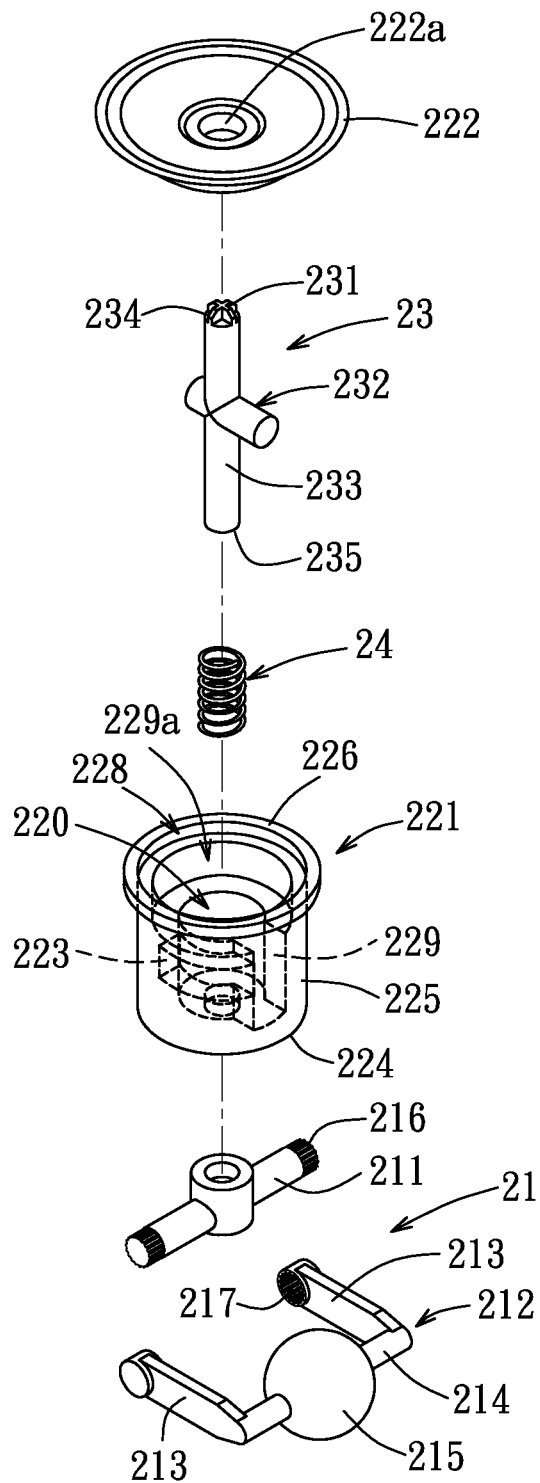
FIG. 4 is an exploded perspective view of the hand tool of the embodiment.
Figure 6:
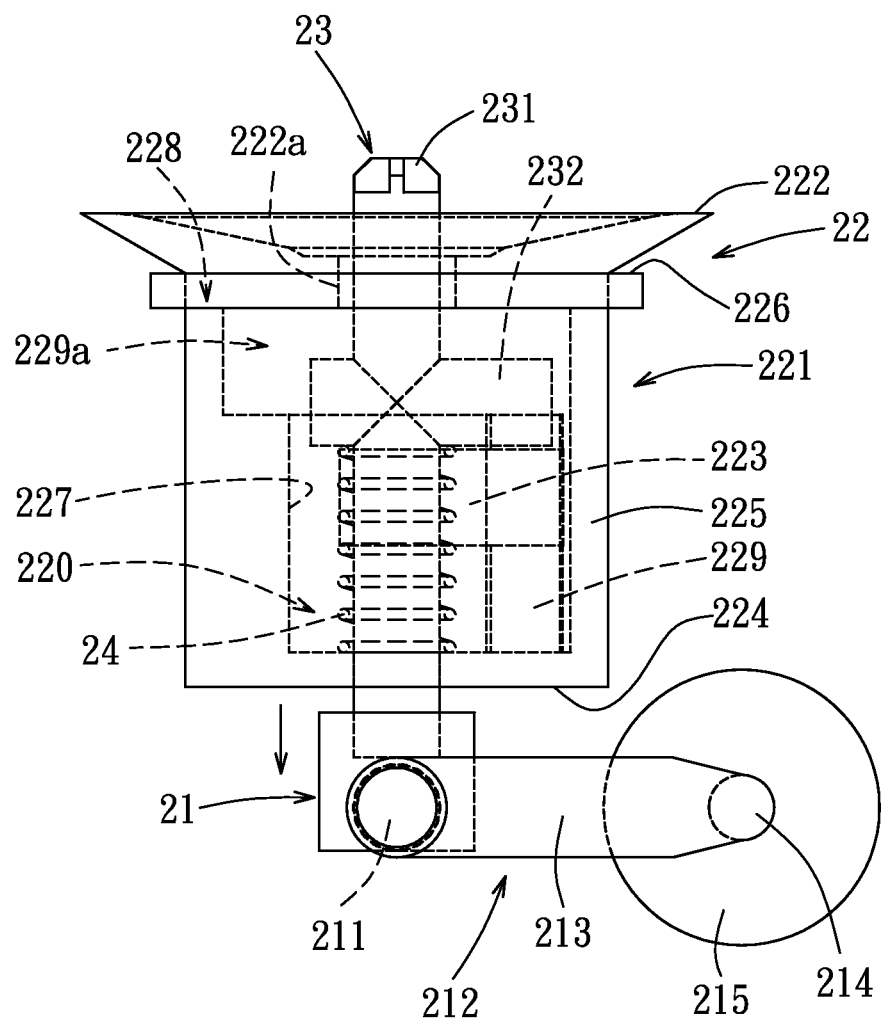
FIG. 6 is a side view of the hand tool of the embodiment, illustrating that a working head is at an extended position.
Figure 8:
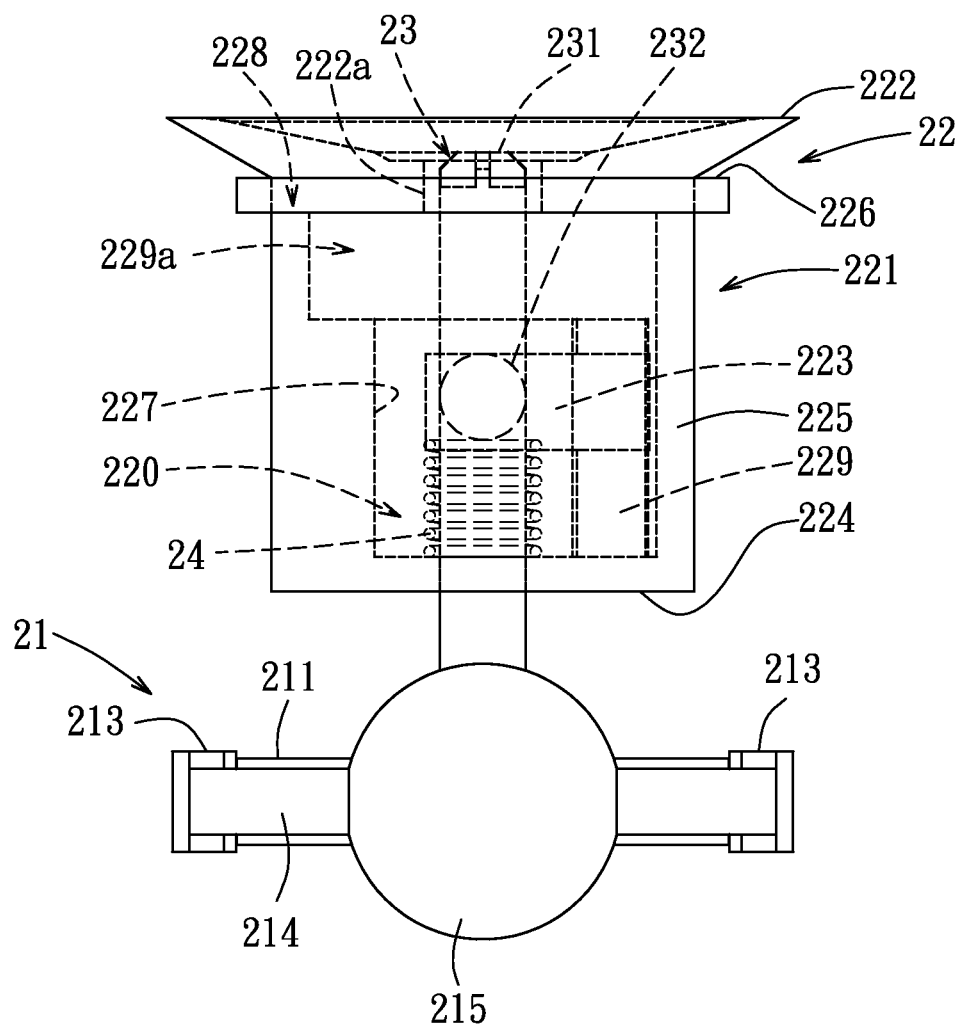
FIG. 8 is a side view of the hand tool of the embodiment, illustrating how the working head is maintained at the retracted position.

Referring to FIGS. 2 and 4, the hand tool 2 further includes a spring 24 disposed between the main body 221 and the tool body 23. The spring 24 is a compression spring, and biases the working head 231 of the tool body 23 to the extended position. In this embodiment, the main body 221 includes a first limiting portion 223. The tool body 23 further includes a second limiting portion 232 connected to the working head 231. The first limiting portion 223 and the second limiting portion 232 are concave and convex structures that are interengagable through operation of the handle body 23. The tool body 23 can be operated to engage the second limiting portion 232 with the first limiting portion 223, so as to maintain the tool body 23 at the retracted position, as shown in FIG. 8. Or, the tool body 23 can be operated to disengage the second limiting portion 232 from the first limiting portion 223, so as to allow the working head 231 of the tool body 23 to be biased to the extended position by the spring 24, as shown in FIG. 6.

Figure 5:
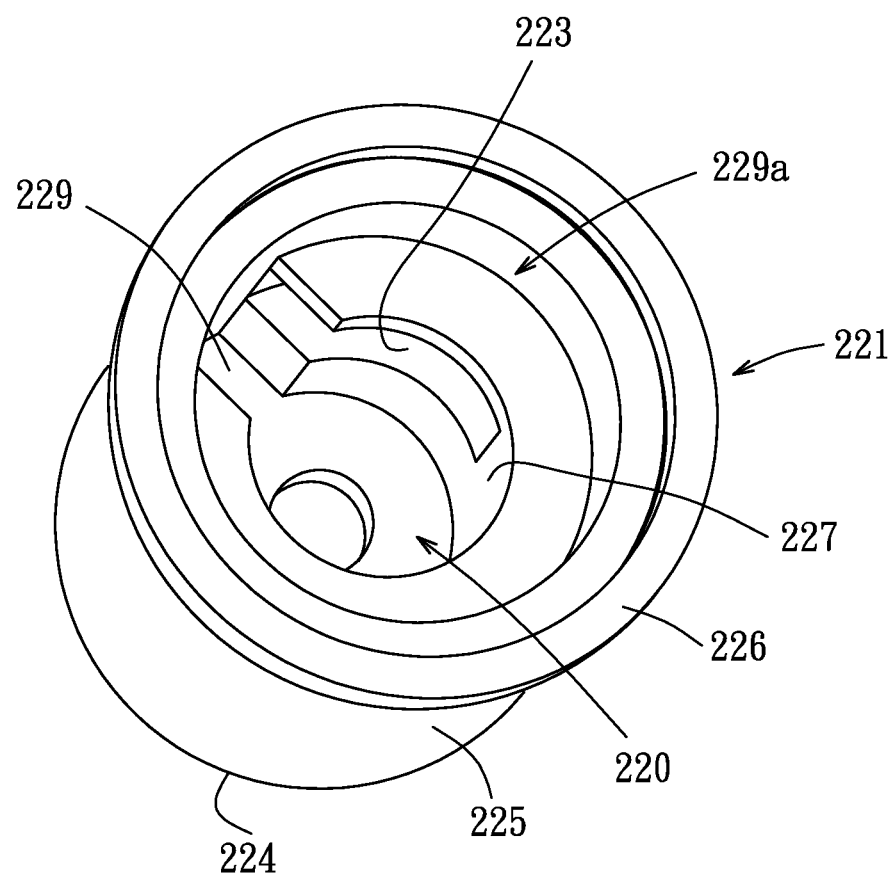
FIG. 5 is a perspective view of a main body of the hand tool of the embodiment.

Referring to FIGS. 4 and 5, more specifically, in this embodiment, the main body 221 is shaped as a hollow shell, and includes a base wall 224 and a peripheral wall 225 configured as a circular tube and connected with the base wall 224. The base wall 224 and the peripheral wall 225 cooperate to define a receiving space 220. The peripheral wall 225 has an end edge 226 distal from the base wall 224, and an inner wall surface 227. The end edge 226 defines an opening 228 in spatial communication with the receiving space 220. The coupling element 222 is disposed at the end edge 226 of the main body 221, and covers the opening 228. The first limiting portion 223 is a curved groove, is formed in the inner wall surface 227 of the peripheral wall 225, and extends along a circumferential direction of the main body 221. The first limiting portion 223 is disposed between the base wall 224 of the main body 221 and the end edge 226 of the peripheral wall 225. The peripheral wall 225 further has a guiding groove 229 extending along an axial direction of the main body 221. The guiding groove 229 is in spatial communication with the first limiting portion 223 at an end thereof, and extends from the first limiting portion 223 toward the end edge 226 of the peripheral wall 225.

In this embodiment, the second limiting portion 232 of the tool body 23 is configured as a protruding rod section that can be extended into the first limiting portion 223. In particular, the second limiting portion 232 is engageable with the first limiting portion 223, as shown in FIG. 8. When the second limiting portion 232 is disengaged from the first limiting portion 223, as shown in FIG. 6, it engages movably the guiding groove 229.

The tool body 23 further includes a rod body 233. The rod body 233 includes a first end 234 and a second end 235 opposite to each other. The working head 231 is disposed at the first end 234 of the rod body 233. The second end 235 projects from the main body 221. The second limiting portion 232 is located between the first end 234 and the second end 235, and is connected and crossed with the rod body 233 to form a cross-shaped rod structure. A portion of the rod body 233 disposed between the second end 235 and the second limiting portion 232 extends through the base wall 224 of the main body 221, such that the second limiting portion 232 is located within the receiving space 220. The first end 234 of the rod body 233 (that is, the end where the working head 231 is located) is adjacent to the opening 228. The working head 231 projects upwardly from the coupling element 222 through a central hole 222a (see FIG. 4) of the coupling element 222, and is extendable and retractable with respect to the coupling element 222. The spring 24 is sleeved on the rod body 233 between the second end 235 and the second limiting portion 232, is located within the receiving space 220, and has two ends abutting respectively against the base wall 224 of the main body 221 and the second limiting portion 232.

The peripheral wall 225 of the main body 221 is formed with an annular space 229a (see FIG. 5) that is in spatial communication with the guiding groove 229 and that is located between the first limiting portion 223 and the end edge 226 of the peripheral wall 225. The annular space 229a is provided for the second limiting portion 232 to rotate therein. During operation and use of the tool body 23, the handle unit 21 is rotated to drive rotation of the tool body 23. Due to formation of the annular space 229a, when the tool body 23 is operated to rotate, the second limiting portion 232 rotates within the annular space 229a relative to the main body 221.

The handle unit 21 is connected with the second end 235 of the tool body 23, so as to serve as a handle to be held for manual operation by a user during operation and use of the hand tool 2. As shown in FIG. 3, when the hand tool 2 is attached to the casing 11 of the device body 1, it can also act as a structure for supporting the hand tool 2 on the supporting surface 102.

In this embodiment, the handle unit 21 includes a rotary lever 211 connected with the second end 235 of the rod body 233, and a handle 212 configured as a U-shaped rod and connected with the rotary lever 211. The second end 235 of the rod body 233 is connected with the rotary lever 211 by bolts or a tongue-and-groove engagement. The handle 212 includes a pair of first rod sections 213, a second rod section 214 connected with the two first rod sections 213, and a spherical body 215 formed on the second rod section 214. Two ends of the rotary lever 211 are respectively connected with the two first rod sections 213. When the hand tool 2 serves as a support for the device body 1, it supports the device body 1 on the supporting surface 102 in such a manner that the spherical body 215 abuts against the supporting surface 102.

Figure 7:
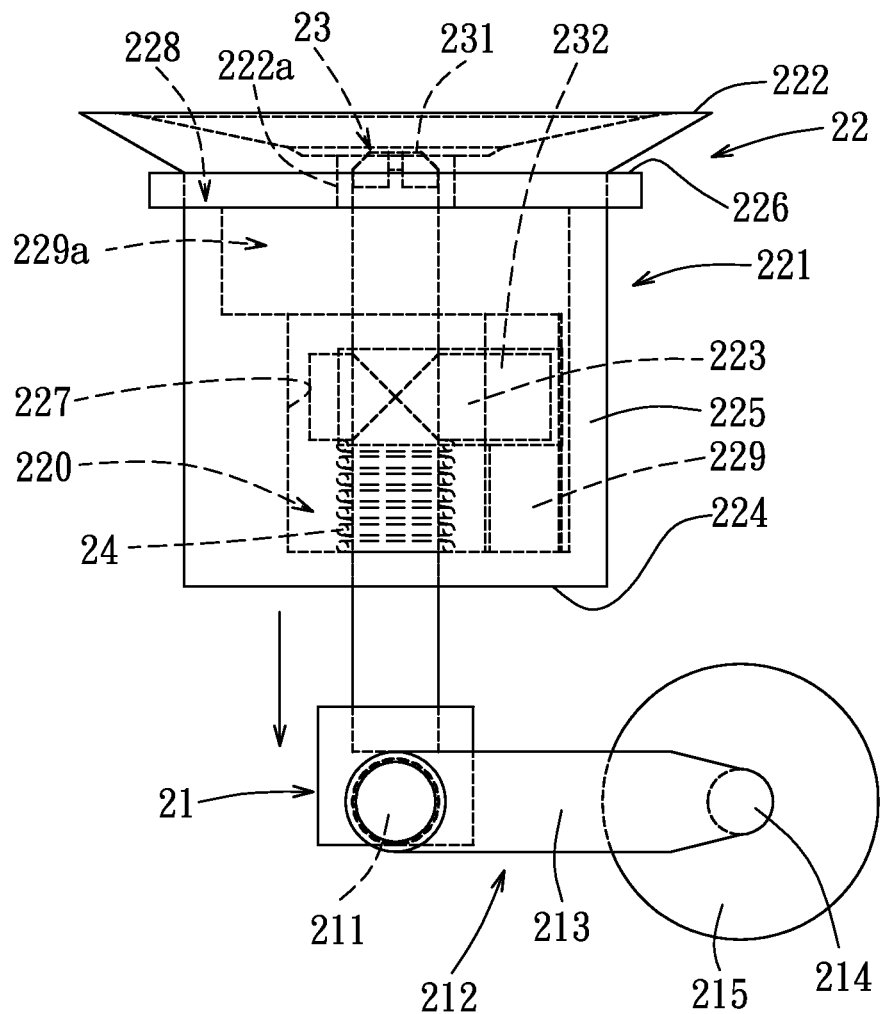
FIG. 7 is a schematic view of the hand tool of the embodiment, illustrating that a handle unit is pulled away from a coupling unit during movement of a working head from the extended position to a retracted position.

Referring to FIGS. 6 to 8, when it is desired to move the working head 231 of the tool body 23 from the extended position to the retracted position, as shown in FIG. 6, the handle unit 21 is pulled away from the coupling unit 22 (in a direction indicated by the arrow in FIG. 6), to move the working head 231 toward the coupling element 222 and compress the spring 24. As shown in FIG. 7, when the second limiting portion 232 of the tool body 23 slides along the guiding groove 229 to a position aligned with the first limiting portion 223 so that the working head 231 of the tool body 23 is retracted into the coupling element 222, the handle unit 21 is rotated to drive rotation of the tool body 23 relative to the coupling unit 22. Hence, as shown in FIG. 8, the second limiting portion 232 of the tool body 23 is engaged into the first limiting portion 223, so as to maintain the working head 231 of the tool body 23 at the retracted position. At this time, the hand tool 2 can be sucked to the device body 1 by the coupling element 222.

On the contrary, when it is desired to move the working head 231 of the tool body 23 from the retracted position to the extended position, the handle unit 21 is rotated to drive rotation of the tool body 23 relative to the coupling unit 22, so as to disengage the second limiting portion 232 of the tool body 23 from the first limiting portion 223 to thereby engage the guiding groove 229. Hence, the tool body 23 is biased by the spring 24 to project from the coupling element 222, in such a manner that the second limiting portion 232 slides along the guiding groove 229, until the working head 231 moves to the extended position.

Figure 9:
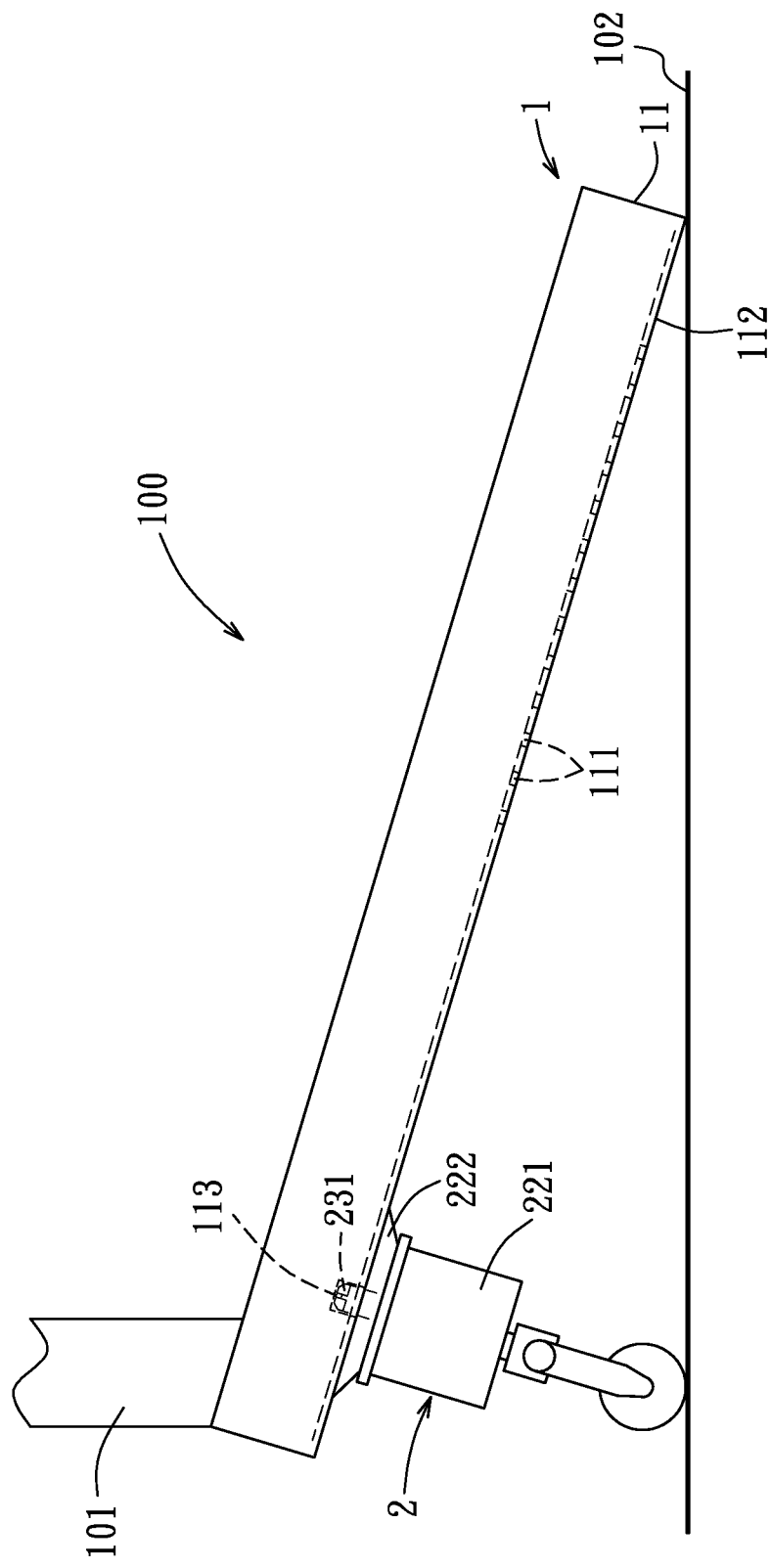
FIG. 9 is a side view of the embodiment, illustrating that a modified casing is formed with an additional hole for permitting extension of the working head thereinto.

Furthermore, referring to FIG. 4, in this embodiment, two ends of the rotary lever 211 are formed respectively with two externally splined portions 216 that engage respectively of internally splined portions 217 of the two first rod sections 213, so as to allow for synchronous rotation of the rotary lever 211 and the handle 212. Due to the presence of such splined structures 216, 217, the handle 212 can be adjusted relative to the rotary lever 211 to a desired angular position, at which the handle unit 21 is convenient to operate. When the hand tool 2 serves as a support for the device body 1, as shown in FIGS. 3 and 9, the height of the left end of the device body 1 raised by the hand tool 2 can be changed by adjusting the angular position of the handle 212 relative to the rotary lever 211. As such, the inclination angle of the device body 1 relative to the supporting surface 102 can be changed with ease.

Alternatively, the hand tool 3 may be attached to the device body 1 in any other suitable manner, e.g., by a magnetic attractive force, a tongue-and-groove engagement, or a threaded connection. In the case of the magnetic attractive force, the coupling element 222 is a magnet, and the device body 1 is provided with a metal element or magnetic element that can be attracted by the magnet. In the case of the tongue-and-groove engagement, the coupling element 222 is a lug or hook formed on the peripheral wall 225 of the main body 221, and the device body 1 is formed with an engaging groove for engaging the lug or hook. In the case of the threaded connection, the coupling element 222 is an externally threaded portion of the peripheral wall 225 of the main body 221, and the casing 11 of the device body 1 is formed with an internally threaded portion engaging the externally threaded portion of the peripheral wall 225 of the main body 221.

When the working head 231 of the tool body 23 is at the extended position, if the bottom wall 112 of the casing 11 of the device body 1 has a planar bottom surface, the coupling element 222 cannot be sucked to the bottom wall 112. In this case, to attach the hand tool 2 to the device body 1, it is necessary to move the working head 231 of the tool body 23 to the retracted position.

However, as shown in FIG. 9, if the casing 11 of the device body 1 is modified to be formed with an additional hole 113 (i.e., threaded hole) in the bottom wall 112, it is not necessary to move the working head 231 of the tool body 23 to the retracted position due to the fact that the working head 231 can be maintained at the extended position and inserted into the additional hole 113 when the coupling element 222 is sucked to the bottom wall 112.

Figure 10:
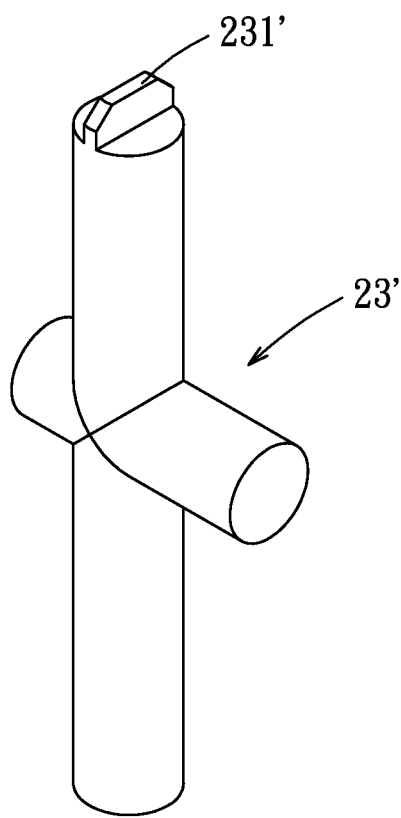
FIGS. 10 and 11 show replaceable tool bodies of the embodiment.
Figure 11:
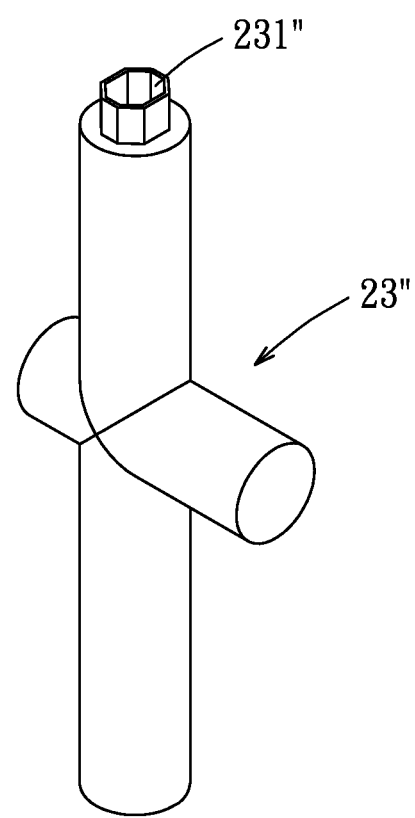

The hand tool 2 can be designed such that the handle unit 21 and the coupling unit 22 are interconnected removably, so that the working head 231 can be replaced with a working head 231' shown in FIG. 10 configured as a flathead screwdriver bit, or a working head 231" shown in FIG. 11 configured as a hexagonal wrench, thereby increasing the applicable range of the hand tool 2.

To sum up, the hand tool 2 of the present invention can be attached to the device body 1 or removed from the device body 1, so that the hand tool 2 can be easily carried together with the device body 1 and can be used conveniently at any time, which solves the problem that the user does not carry a specific hand tool when he or she needs to disassemble the device body 1, and which avoids inconvenience resulting from carrying the specific hand tool, thereby achieving the objects of the present invention. Furthermore, when attached to the device body 1, the hand tool 2 can serve as a support for the device body 1, thereby facilitating dissipation of heat from a bottom portion of the device body 1. Further, if necessary, the tool body 23 may be replaced with one having a different structure to further increase the applicable range of the hand tool 2.

While the present invention has been described in connection with what are considered the most practical and embodiments, it is understood that this invention is not limited to the disclosed embodiments but is intended to cover various arrangements included within the spirit and scope of the broadest interpretation, so as to encompass all such modifications and equivalent arrangements.

What is claimed is:

1. A hand tool adapted to be attached to a device body of a portable electronic device, said hand tool comprising:
    a handle unit;
    a coupling unit including
        a main body, and
        a coupling element disposed on said main body and adapted to be attachable removably to the portable electronic device; and
    a tool body connected between said handle unit and said coupling unit, and including a working head projecting from said coupling element.

2. The hand tool according to claim 1, wherein said tool body is disposed movably within said main body, such that said working head is movable relative to said main body between an extended position, where said working head projects from said coupling member, and a retracted position, where said working head is retracted into said main body.

3. The hand tool according to claim 2, further comprising a compression spring disposed between said main body and said tool body, said main body including a first limiting portion, said tool body further including a second limiting portion, wherein, when said second limiting portion engages said first limiting portion, said working head is disposed at the retracted position, and said compression spring is compressed, and when said second limiting portion is removed from said first limiting portion, said compression spring applies a biasing force to said tool body, so as to bias said working head to project from said coupling element.

4. The hand tool according to claim 3, wherein said main body includes a bottom wall and a peripheral wall connected with said bottom wall, said tool body extending through said bottom wall of said main body, said peripheral wall having an inner wall surface, said first limiting portion being disposed at said inner wall surface of said peripheral wall.

5. The hand tool according to claim 4, wherein said first limiting portion is a groove formed in said inner wall surface of said peripheral wall, said tool body further including a rod body extending through said bottom wall of said main body and having a first end and a second end, said working head being formed at said first end, said second end of said rod body being connected with said handle unit, said second limiting portion being a protruding rod section disposed between said first end and said second end of said rod body, said compression spring being disposed between and abutting against said bottom wall of said main body and said second limiting portion.

6. The hand tool according to claim 1, wherein said handle unit includes a handle connected with said tool body and having a spherical body, said hand tool being adapted to support the device body of the portable electronic device on a supporting surface, in such a manner that said spherical body abuts against the supporting surface.

7. The hand tool according to claim 6, wherein said handle unit further includes a rotary lever for connecting said handle to said tool body, said handle further including a pair of first rod sections connected respectively with two ends of said rotary lever, and a second rod section connected with said two first rod sections, said spherical body being disposed at said second rod section.

8. The hand tool according to claim 1, wherein said coupling element is a sucking disc, and has a central hole, and said working head projecting from said coupling element through said central hole.

9. A portable electronic device, comprising:
a device body including a casing and a plurality of electronic components disposed within said casing, and
a hand tool, including:
a handle unit;
a coupling unit including a main body and a coupling element disposed on said main body and attachable removably to said casing, and
a tool body connected between said handle unit and said coupling unit and including a working head projecting from said coupling element.

10. The portable electronic device according to claim 9, wherein said casing of said device body includes a bottom wall, said coupling element being attached to said bottom wall of said casing and being adapted to support said device body on a supporting surface, said bottom wall being formed with a plurality of heat-dissipating holes in a bottom surface thereof.

11. The portable electronic device according to claim 10, wherein said casing of said device body includes a bottom wall, said bottom wall having a bottom surface formed with a hole, said working head extending into said hole in said bottom wall when said coupling element is attached to said casing.

12. The portable electronic device according to claim 9, wherein said tool body extends through said main body, and is operable to move said working head relative to said coupling element to thereby project from said coupling element or retract into said main body.

13. The portable electronic device according to claim 12, wherein said hand tool further includes a compression spring disposed between said main body and said tool body, said main body including a first limiting portion, said tool body further including a second limiting portion, wherein, when said second limiting portion engages said first limiting portion, said working head is retracted into said main body, and said compression spring is compressed, and when said second limiting portion is removed from said first limiting portion, said compression spring applies a biasing force to said tool body, so as to bias said working head to project from said coupling element.

14. The portable electronic device according to claim 13, wherein said main body includes a bottom wall and a peripheral wall connected with said bottom wall, said tool body extending through said bottom wall of said main body, said peripheral wall having an inner wall surface, said first limiting portion being disposed at said inner wall surface of said peripheral wall.

15. The portable electronic device according to claim 14, wherein said first limiting portion is a groove formed in said inner wall surface of said peripheral wall, said tool body further including a rod body extending through said bottom wall of said main body and having a first end and a second end, said working head being formed at said first end, said second end of said rod body being connected with said handle unit, said second limiting portion being a protruding rod section disposed between said first end and said second end of said rod body, said compression spring being disposed between and abutting against said bottom wall of said main body and said second limiting portion.

16. The portable electronic device according to claim 9, wherein said handle unit includes a handle connected with said tool body and having a spherical body, said hand tool being adapted to support said device body on a supporting surface, in such a manner that said spherical body abuts against said supporting surface.

17. The portable electronic device according to claim 16, wherein said handle unit further includes a rotary lever for connecting said handle to said tool body, said handle further including a pair of first rod sections connected respectively with two ends of said rotary lever, and a second rod section connected with said two first rod sections, said spherical body being disposed at said second rod section.

18. The portable electronic device according to claim 9, wherein said coupling element is a sucking disc, and has a central hole, said working head projecting from said coupling element through said central hole.

* * * * *